Nov. 14, 1967  N. T. ALMQUIST  3,352,536
SELF-REGULATING TURBINE
Filed June 11, 1952
2 Sheets-Sheet 1

INVENTOR.
Nils T. Almquist
BY
G. J. Kessenich + A. W. Dew
ATTORNEYS
and F. E. McGee
AGENT Nov. 14, 1967    N. T. ALMQUIST    3,352,536
SELF-REGULATING TURBINE
Filed June 11, 1952    2 Sheets-Sheet 2
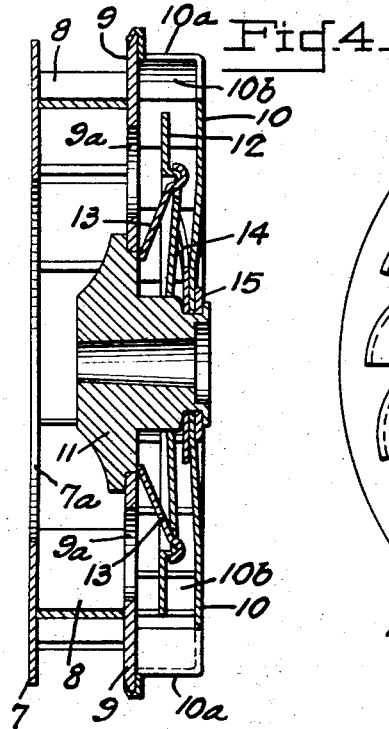
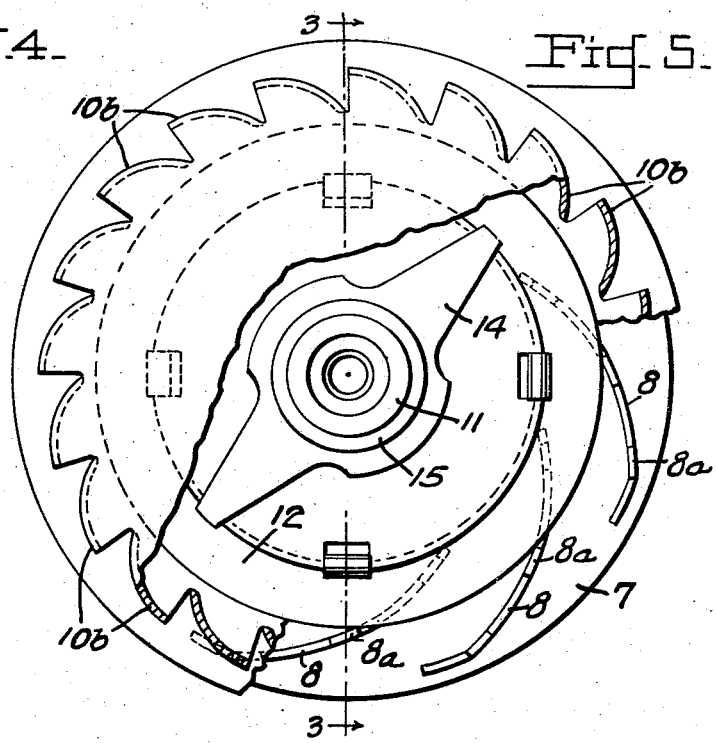
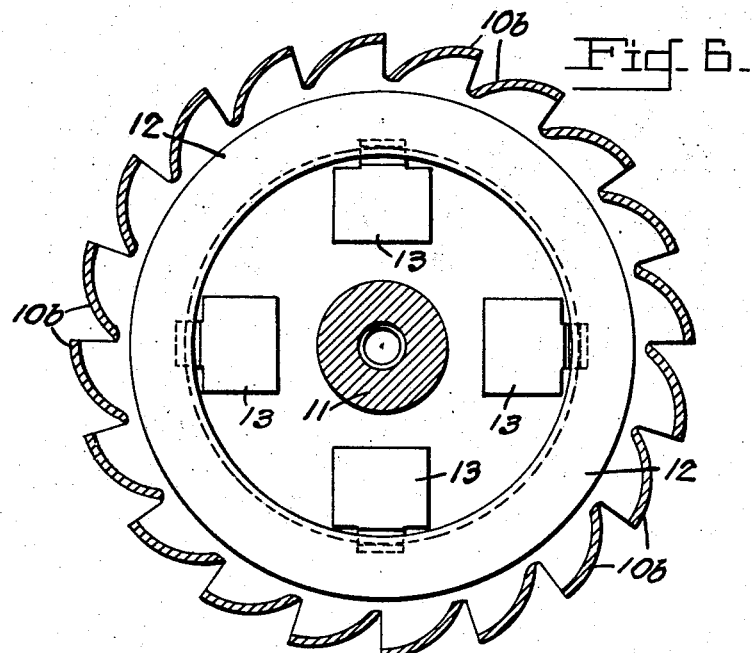
INVENTOR.
Nils T. Almquist

United States Patent Office 3,352,536
Patented Nov. 14, 1967

3,352,536
SELF-REGULATING TURBINE
Nils T. Almquist, assignor to the United States of America as represented by the Secretary of the Army
Filed June 11, 1952, Ser. No. 292,874
4 Claims. (Cl. 253—59)

In various ordnance missiles in which the fusing system requires electric power, such power is often obtained from a generator operated by a wind-driven turbine. Generators of this type customarily produce alternating current. It is obvious that the voltage and frequency of the generator output will be determined largely by the speed of rotation of the turbine and hence the generator rotor, for a given design of generator. From the foregoing, it is apparent that if the generator's rotational speed can be maintained virtually constant, the generator's output will be more uniform, as is desirable. Such speed uniformity can be obtained, at least to a large degree, by use of a turbine, the rotational speed of which tends to remain relatively constant, regardless of its forward speed in relation to an airstream, the duration of such motion, or the density of the air which passes through the turbine.

To achieve this result, I have invented a turbine so designed as to operate efficiently until it reaches the desired rotational speed, after which its efficiency decreases, causing it to remain at or near the desired rotational speed. The manner in which I cause this effect will be apparent to one skilled in the art from reference to the accompanying drawings and description.

FIGURE 4 is a cross sectional view of the turbine, taken on line 3—3 of FIGURE 5, showing the position of the speed-regulating mechanism after the turbine has reached the desired operating speed, in which a portion of the airstream is diverted from pasage through the main turbine blades, and is caused to pass through the secondary (bucking) turbine blades.

FIGURE 5 shows a rear view of the turbine, with a portion broken away to show the springs which are part of the speed-regulating mechanism.

FIGURE 6 shows a front view of the turbine with a portion broken away to show the weights which are part of the speed-regulating mechanism.

The action of the turbine, as hereinafter described, depends upon a stream of air or other fluid which normally impinges on the major blades of the turbine, but is partially diverted to impinge on some secondary reversed blades, thus opposing the normal direction of rotation of the turbine when certain ports are opened due to the centrifugal action of spring-opposed weights which are under the centrifugal force of turbine rotation.

Figure 1:
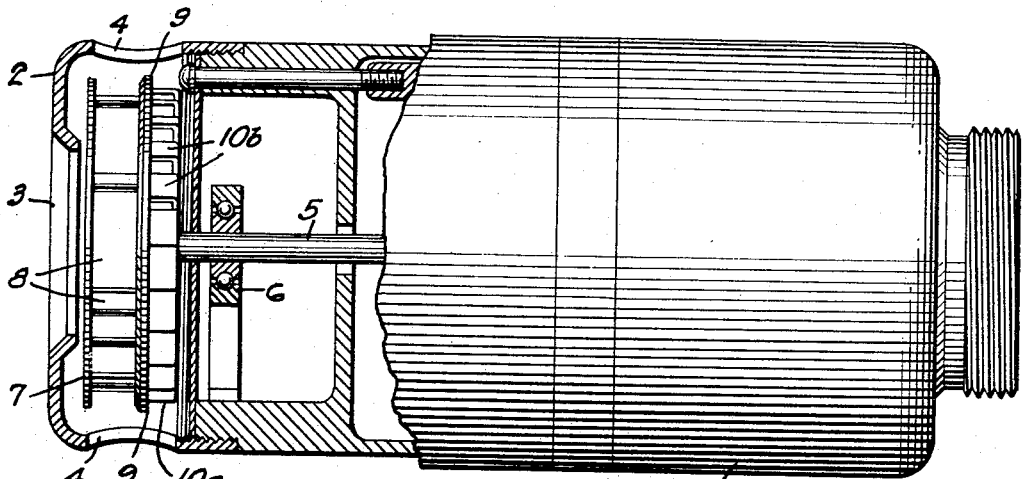
FIGURE 1 represents an ordnance fuse, with a portion cut away to show a preferred location of the turbine.

Referring now to FIGURE 1, a casing 1, which holds a fuse mechanism including a generator, not shown, has a nose portion 2 provided with an inlet duct 3 and outlet ports 4. A shaft 5, supported in bearings 6, connects the generator to the turbine. The turbine rotor means has a front plate 7, major vanes 8, an intermediate plate 9, and secondary (bucking) blades 10b.

Figure 2:
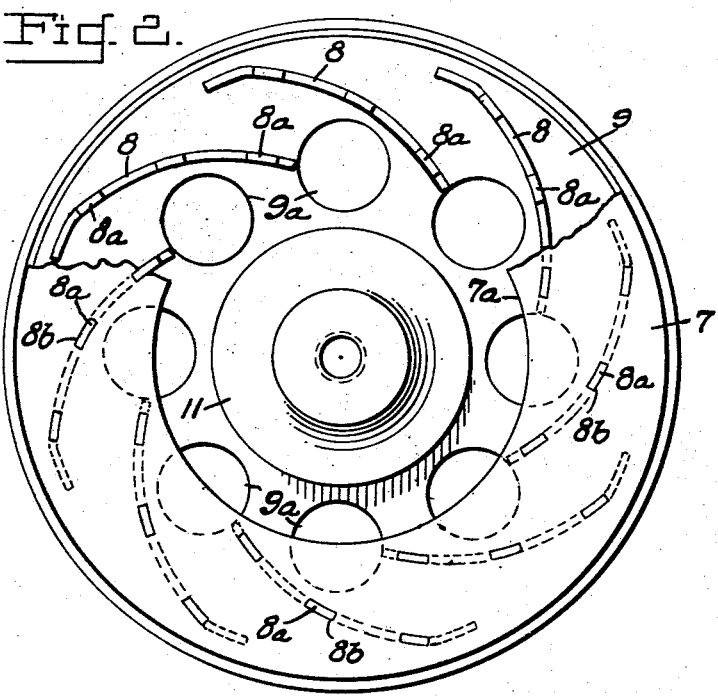
FIGURE 2 is a front view of the turbine, with a portion cut away to reveal the main turbine blades.

In FIGURE 2, a portion of the front plate 7 is cut away to show the major blades 8, which are staked to said front plate by means of lips 8a in perforations 8b, and are similarly staked to the intermediate plate 9. Ports 9a are provided in the intermediate plate 9 to permit the passage of air under certain conditions as hereinafter described. A hub 11, affixed to the intermediate plate, serves to deflect the airstream admitted through the orifice 7a in the front plate and to mount the turbine assembly to axle 5.

Figure 3:
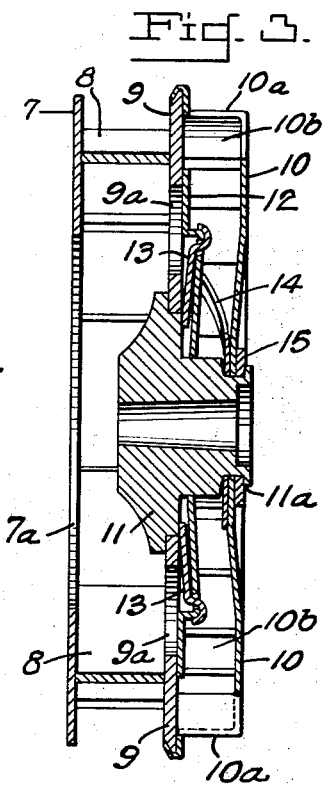
FIGURE 3 is a cross sectional view of the turbine, taken on line 3—3 of FIGURE 5, showing the position of the speed-regulating mechanism before the turbine has reached the desired operating speed, in which the airstream passes only through the main turbine blades.

FIGURE 3 is a cross-section, showing the position of the regulating portion of our turbine before the system is brought to operating speed. It will be seen that a backing plate 12 is positioned behind intermediate plate 9 and so serves to prevent the passage of air through ports 9a formed in plate 9. The said plate 12 is held in position against the back of plate 9 by spring 14 and has mounted on it, between plate 9 and plate 12, a plurality of hinged weights 13, so positioned that when radial thrust is present, as due to centrifugal force, said weights 13 will be restrained from moving radially outward, but will tend to pivot where affixed to plate 12, forcing said plate backward against spring 14. A cup-shaped member 10 has its vertical walls 10a provided with the reverse turbine blades 10b, and is held in place on the hub assembly by means of washer 15 and staking 11a of hub 11.

FIGURE 4 shows the condition existing when the rotational speed of the turbine is so great that regulation has taken place. The position assumed by weights 13 under centrifugal force is seen to have caused plate 12 to move rearwardly from port 9a, permitting air to pass from 7a through 9a and through 10 without passing through blades 8. The system is so designed that only a portion of the air, admitted through opening 7a, passes through port 9a, the major portion passing through blades 8, so that the desired direction of rotation of the turbine is maintained though the speed of such rotation is opposed by the action of the air on reverse blades 10b. A further effect of centrifugal force is to weaken spring 14, thus facilitating the rearward movement of plate 12.

FIGURE 5 shows a partially cut-away rear view of the turbine rotor, illustrating one arrangement of weights 13 and showing a general configuration of the spring 14.

FIGURE 6 is a front view of the blocking plate 12, showing an example of the way in which the weights 13 may be positioned.

While the use of weights 13 is contemplated in most models of the self-regulating turbine, it is also contemplated that the use of centrifugal force weakening the spring 14 and thus permitting the air pressure to cause rearward displacement of plate 12 may be employed.

It will be apparent that the embodiments shown are only exemplary and that various modifications can be made in construction and arrangement within the scope of the invention as defined in the appended claims.

I claim:

1. A self-regulating turbine comprising a housing having an inlet and exhaust means, rotor means mounted on a shaft journaled in the housing, said rotor means comprising a primary rotor, a counteracting rotor affixed to the primary rotor, controlled port means intermediate said primary rotor and said counteracting rotor for admitting air to the latter, and centrifugally operated means cooperatively associated with said port means for controlling the amount of air admitted to said counteracting rotor when the rotor means has obtained a predetermined speed.

2. In a self-regulating turbine the combination of a driving turbine and a retarding turbine, said turbines being affixed to each other on a single shaft, and valve means integral with said turbines and rotatable therewith, the valve means spilling air from said driving turbine to said retarding turbine to create a force in opposition to the force of said driving turbine and thereby control the speed of the driving turbine after a predetermined speed has been obtained.

3. A self-regulating turbine including a rotor unit comprising a driving turbine, a counteracting turbine, and means for controlling the flow of air to the counteracting turbine, the primary turbine consisting of a front disk member having a central perforation for admission of air therethrough, a back disk member spaced from the front disk by means of blades peripherally spaced and each having their opposed longitudinal edges affixed to said members, a hub centrally fixed in the back disk member, air ports formed in the back disk member and spaced from the hub, the counteracting turbine consisting of a cup-shaped member mounted on the hub and having its peripheral edge affixed to the peripheral edge of the back disk member, bucket-like blades formed in the lateral walls of the cup-shaped member in opposition to the blades of the driving turbine, a resilient member mounted on the hub intermediate the back disk and cup-shaped member, the resilient member normally covering the air ports but uncovering the air ports under the action of centrifugal force to admit air through the air ports to the bucket-like blades and thereby producing a retarding force on the speed of the rotor unit to maintain said speed constant after the unit has obtained a predetermined speed.

4. A self-regulating turbine including a rotor unit comprising a driving turbine, a counteracting turbine and means for controlling the flow of air to the counteracting turbine, the driving turbine consisting of a front disk having a central perforation for admission of air therethrough, a back disk spaced from the front disk by means of peripherally spaced blades having their opposed longitudinal edges affixed to the respective disks, a hub centrally fixed in the back disk, air ports formed in the back disk and spaced from the hub, the counteracting turbine consisting of a cup-shaped member mounted on the hub and having its peripheral edge affixed to the peripheral edge of the back disk, bucket-like blades formed in the lateral walls of the cup-shaped member in opposition to the blades of the driving turbine, a second cup-shaped member slidably mounted on the hub intermediate the back disk and counteracting turbine, a spring member affixed to said hub and urging the second cup-shaped member in closed relationship to the air ports, diametrically opposed weights pivotally hinged in the walls of said second cup-shaped member, said weights swinging outwardly under centrifugal force and urging the second cup-shaped member longitudinally of the hub against said spring member to uncover the air ports and thereby permit air to spill therethrough against the bucket-shaped vanes and oppose the speed of rotation of the driving turbine after a predetermined speed has been obtained by the rotor unit.

References Cited

UNITED STATES PATENTS

| 1,008,550 | 11/1911 | Loewenstein | 253—143 |
| 2,407,454 | 9/1946 | Seewer | 253—143 |

EVERETTE A. POWELL, Jr., *Primary Examiner.*

SAMUEL BOYD, *Examiner.*